(12) United States Patent
Kapoor et al.

(10) Patent No.: US 8,671,099 B2
(45) Date of Patent: Mar. 11, 2014

(54) CLUSTERING DEVICES IN AN INTERNET OF THINGS ('IOT')

(75) Inventors: Shalini Kapoor, Bangalore (IN); Shachi Sharma, Yamuna Vihar (IN); Bharat Srinivasan, Secunderabad (IN)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 13/338,689

(22) Filed: Dec. 28, 2011

(65) Prior Publication Data

US 2013/0173621 A1 Jul. 4, 2013

(51) Int. Cl.
*G06F 7/04* (2006.01)
*G06F 17/30* (2006.01)

(52) U.S. Cl.
USPC ............ 707/738; 707/737; 707/740; 707/749

(58) Field of Classification Search
None
See application file for complete search history.

(56) References Cited

U.S. PATENT DOCUMENTS

| 7,461,145 | B2 | 12/2008 | Hirschman et al. |
| 7,752,233 | B2 | 7/2010 | Vempala et al. |
| 7,945,713 | B2 | 5/2011 | Joo et al. |
| 7,961,645 | B2 | 6/2011 | Gudipudi et al. |
| 2010/0305990 | A1 | 12/2010 | Tyree et al. |
| 2011/0022733 | A1 | 1/2011 | Karaoguz et al. |
| 2012/0197898 | A1* | 8/2012 | Pandey et al. .................. 707/741 |
| 2012/0303618 | A1* | 11/2012 | Dutta et al. .................... 707/737 |

OTHER PUBLICATIONS

Römer et al., "Real-Time Search for Real-World Entities: A Survey", in Proceedings of the IEEE, Nov. 2010, pp. 1887-1902, vol. 98, issue 11, Digital Object Identifier: 10.1109/JPROC.2010.2062470, IEEE Computer Society, Lubeck, Germany.

Oliveira et al., "Privacy-Preserving Clustering by Object Similarity-Based Representation and Dimensionality Reduction Transformation", in Proceedings of the IEEE International Conference on Data Mining (ICDM) Workshop on Privacy and Security Aspects of Data Mining (PSDM), Nov. 2004, pp. 21-30, IEEE Computer Society, Brighton, UK.

Liu et al., "A General Distributed Object Locating Architecture in the Internet of Things", in 2010 IEEE 16th International Conference on Parallel and Distributed Systems (ICPADS), Dec. 2010, pp. 730-735, Digital Object Identifier: 10.1109/ICPADS.2010.30, IEEE Computer Society, Shanghai, China.

(Continued)

*Primary Examiner* — Bruce Moser
(74) *Attorney, Agent, or Firm* — Edward J. Lenart; Katherine S. Brown; Biggers Kennedy Lenart Spraggins LLP (57) ABSTRACT

Clustering devices in an Internet of Things ('IoT'), including: receiving, by a device clustering module, a characteristic set for a device, wherein the characteristic set specifies one or more device attributes and an attribute value for each device attribute; clustering, by the device clustering module, the device into an attribute level cluster based on the one or more device attributes specified in the characteristic set for the device; and clustering, by the device clustering module, the device into a value level cluster based on the attribute value for each device attribute, wherein the value level cluster is a subset of the attribute level cluster.

18 Claims, 6 Drawing Sheets

(56) References Cited

OTHER PUBLICATIONS

Arastoopoor, "Search Tools Through the Glass: A Story of Clustering Search Results According to Document Attributes With a Glance on the Web", in Second International Conference on the Applications of Digital Information and Web Technologies (ICADIWT '09) Aug. 2009, pp. 823-825, Digital Object Identifier: 10.1109/ICADIWT.2009.5273958, IEEE Computer Society, Mashhad, Iran.

Zhang et al., "An Attribute Reduction Algorithm Based on Clustering and Attribute-Activity Sorting", in 2010 International Conference on Computational and Information Sciences (ICCIS), Dec. 2010, pp. 709-712, Digital Object Identifier: 10.1109/ICCIS.2010.176, IEEE Computer Society, Beijing, China.

* cited by examiner

CLUSTERING DEVICES IN AN INTERNET OF THINGS ('IOT')

BACKGROUND OF THE INVENTION

1. Field of the Invention

The field of the invention is data processing, or, more specifically, methods, apparatus, and products for clustering devices in an Internet of Things ('IoT').

2. Description of Related Art

In an Internet of Things ('IoT'), a wide variety of devices may exist. Each device may include different attributes, different capabilities, be located at different places, and so on. Without identifying common features and aspects of the many devices that make up an IoT, managing heterogeneous devices in the IoT may become difficult.

SUMMARY OF THE INVENTION

Methods, apparatus, and products for clustering devices in the Internet of Things ('IoT'), including: receiving, by a device clustering module, a characteristic set for a device, wherein the characteristic set specifies one or more device attributes and an attribute value for each device attribute; clustering, by the device clustering module, the device into an attribute level cluster based on the one or more device attributes specified in the characteristic set for the device; and clustering, by the device clustering module, the device into a value level cluster based on the attribute value for each device attribute, wherein the value level cluster is a subset of the attribute level cluster.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Example methods, apparatus, and products for clustering devices in the Internet of Things ('IoT') in accordance with the present invention are described herein. IoT refers to uniquely identifiable objects (things) and their virtual representations in an Internet-like structure. IoT can be thought of as a dynamic global network infrastructure with self configuring capabilities based on standard and interoperable communication protocols in which both physical and virtual things have identities and attributes. Such physical and virtual things can be seamlessly integrated into traditional networks. IoT can make use of radio-frequency identification ('RFID') technologies to identify and inventory each thing in the IoT. IoT can also make use of other technologies such as barcodes as well.

Figure 1:
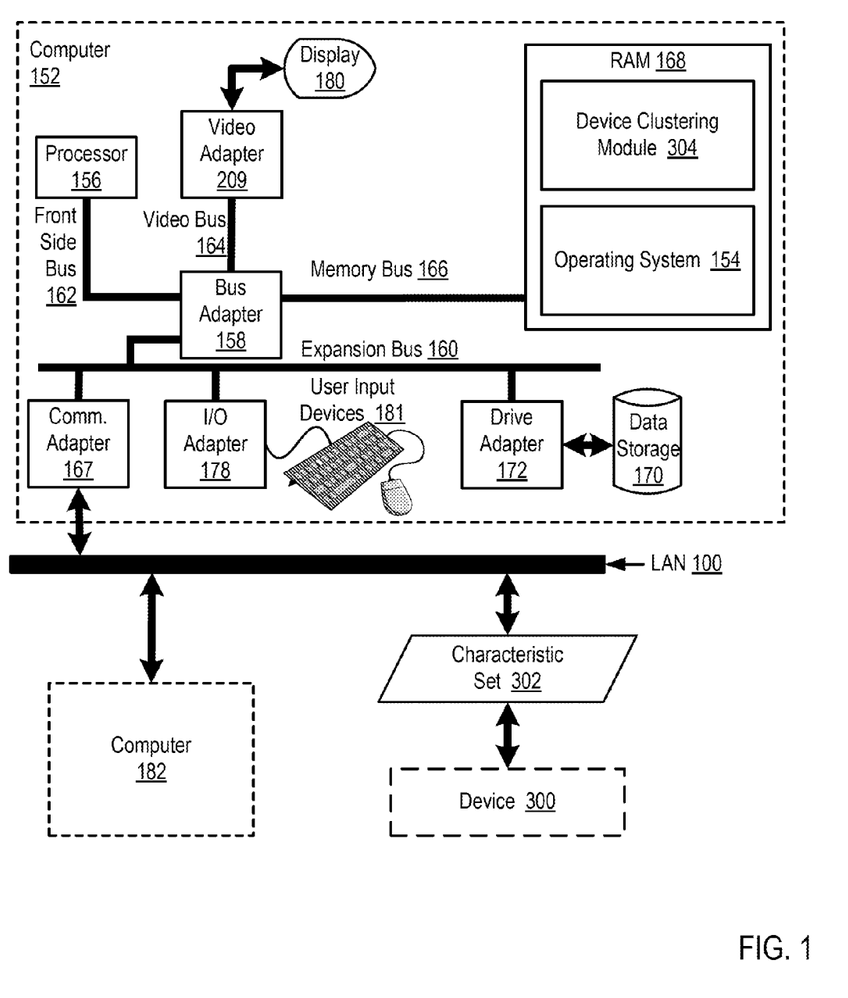
FIG. 1 sets forth a block diagram of automated computing machinery comprising an example computer useful in clustering devices in an Internet of Things ('IoT') according to embodiments of the present invention.

Example methods, apparatus, and products for clustering devices in the IoT in accordance with the present invention are described with reference to the accompanying drawings, beginning with FIG. 1. FIG. 1 sets forth a block diagram of automated computing machinery comprising an example computer (152) useful in clustering devices in an IoT according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a device clustering module (304), a module of computer program instructions for clustering devices in an IoT in accordance with the present invention. The device clustering module 'clusters' Internet connected devices in the sense that the device clustering module (304) associates similar Internet connected devices with a particular cluster group. The device clustering module (304) can cluster Internet connected devices, for example, through the use of a database, table, or other data structure that includes an identifier of a particular device and an identifier of a particular cluster that the device is part of. Clustering similar Internet connected devices within a particular cluster group can enable a larger system to better manage a collection of heterogeneous devices by, for example, imposing usage rules and policies on the set of similar devices that are included in a cluster group, providing access control and security restrictions to the set of similar devices that are included in a cluster group, performing device configuration operations on the set of similar devices that are included in a cluster group, and so on.

The device clustering module (304) of FIG. 1 is configured to receive a characteristic set (302) for a device (300). The characteristic set (302) of FIG. 1 specifies one or more device attributes and an attribute value for each device attribute. Devices may be deemed as being similar and therefore subject to clustering in dependence on attributes of the device such as, for example, the type of network connection supported by the device, the communications protocols supported by the device, the manufacturer of the device, different capabilities of the device, and so on. Such device attributes are specified in a characteristic set (302) that specifies one or more device attributes and an attribute value for each device attribute. The characteristic set (302) of FIG. 1 may be embodied, for example, as a structured document such as an extensible markup language ('XML') document that includes an identifier of a particular attribute of the device (300) as well as a value for the attribute. Consider the following example of a characteristic set (302) embodied as an XML document:

```
<ns:deviceData xmlns:ns="urn:foo">
    <ns: attribute id = "1">
        <ns:name>deviceType</ns:name>
        <ns:value>MobilePhone</ns:value>
```

-continued

```
    </ns:attribute>
    <ns: attribute id = "2">
        <ns:name>manufacturer</ns:name>
        <ns:value>Nokia</ns:value>
    </ns:attribute>
    <ns: attribute id = "3">
        <ns:name>model</ns:name>
        <ns:value>N72</ns:value>
    </ns:attribute>
</ns:deviceData>
```

Included in the example characteristic set (302) above are three attributes and values for each attribute that describe the device that the characteristic set (302) represents. The first attribute is a 'deviceType' attribute with a value set to 'MobilePhone' which indicates that the device is a mobile phone. The second attribute is a 'manufacturer' attribute with a value set to 'Nokia' which indicates that the mobile phone is manufactured by Nokia™. The third attribute is a 'model' attribute with a value set to 'N72' which indicates the manufacturer's mobile number for the mobile phone. Readers will appreciate that the example characteristic set (302) set forth above can include a number of additional attributes and values associated with such attributes that can be used to describe additional information about the device that is associated with the characteristic set.

The device clustering module (304) of FIG. 1 is also configured to cluster the device (300) into an attribute level cluster based on the one or more device attributes specified in the characteristic set (302) for the device (300). The attribute level cluster is a cluster of devices that have similar attributes—with no consideration given to the values associated with each attribute. Clustering the device (300) into an attribute level cluster based on the one or more device attributes specified in the characteristic set (302) for the device (300) may therefore be carried out by inspecting the attributes of devices within each attribute level cluster and identifying the attribute level cluster whose devices have attributes that are most similar to the device attributes specified in the characteristic set (302) for the device (300).

Consider an example in which the device is a mobile phone whose characteristic set (302) includes attributes named 'mobileCarrier,' 'areaCode,' 'gpsEnabled,' and 'telecommunicationsWirelessStandard.' Furthermore, assume that a first attribute level cluster includes devices that include attributes named 'mobileCarrier,' 'areaCode,' 'telecommunicationsWirelessStandard,' 'manufacturer,' and 'model.' Additionally, assume that a second attribute level cluster includes devices that include attributes named 'displayType,' 'screenSize,' 'numberOfHDMIPorts,' and 'dolbySoundVersion.' In such an example, the first attribute level cluster appears to be a cluster of mobile phones while the second attribute level cluster appears to be a cluster of televisions.

Clustering the device (300) into an attribute level cluster based on the one or more device attributes specified in the characteristic set (302) for the device (300) may be carried out by inspecting the attributes of devices within each attribute level cluster and identifying the attribute level cluster whose devices have attributes that are most similar to the device attributes specified in the characteristic set (302) for the device (300). In the example described above, the mobile phone whose characteristic set (302) includes attributes named 'mobileCarrier,' 'areaCode,' 'gpsEnabled,' and 'telecommunicationsWirelessStandard' has three attributes in common with the devices in the first attribute level cluster and zero attributes in common with the devices in the second attribute level cluster. As such, the device (300) would be clustered into the first attribute level cluster as the device has attributes that are more similar to the devices in the first attribute level cluster than the devices in the second attribute level cluster.

The device clustering module (304) of FIG. 1 is also configured to cluster the device (300) into a value level cluster based on the attribute value for each device attribute. In the example method of FIG. 1, the value level cluster is a cluster of devices that have similar attributes and also have similar values for identical attributes. In the example of FIG. 1, the value level cluster is a subset of the attribute level cluster.

Consider the example described above in which the device (300) is a mobile phone whose characteristic set (302) includes attributes named 'mobileCarrier,' 'areaCode,' 'gpsEnabled,' and 'telecommunicationsWirelessStandard.' In such an example, assume that the characteristic set (302) includes the following values for each attribute: mobileCarrier=Verizon, areaCode=512, gpsEnabled=yes, and telecommunicationsWirelessStandard=4G. Furthermore, assume that the attribute values of devices in a first value level cluster are: mobileCarrier=Sprint, areaCode=214, gpsEnabled=no, and telecommunicationsWirelessStandard=3G. Additionally, assume that the attribute values of devices in a first value level cluster are: mobileCarrier=Verizon, areaCode=214, gpsEnabled=yes, and telecommunicationsWirelessStandard=4G. In such an example, the values associated with each attribute of the device (300) match zero of the values of devices in the first value level cluster and the values associated with each attribute of the device (300) match three of the values of devices in the second value level cluster. In such an example, the device (300) can be clustered in the second value level cluster as the attribute values for the device (300) are more similar to devices in the second value level cluster than devices in the first value level cluster.

Also stored in RAM (168) is an operating system (154). Operating systems useful clustering devices in an IoT according to embodiments of the present invention include UNIX™, Linux™, Microsoft XP™, AIX™, IBM's i5/OS™, and others as will occur to those of skill in the art. The operating system (154) and device clustering module (304) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for clustering devices in an IoT according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for clustering devices in an IoT according to embodiments of the present invention include modems for wired dial-up communications, Ethernet (IEEE 802.3) adapters for wired data communications network communications, and 802.11 adapters for wireless data communications network communications.

Figure 2:
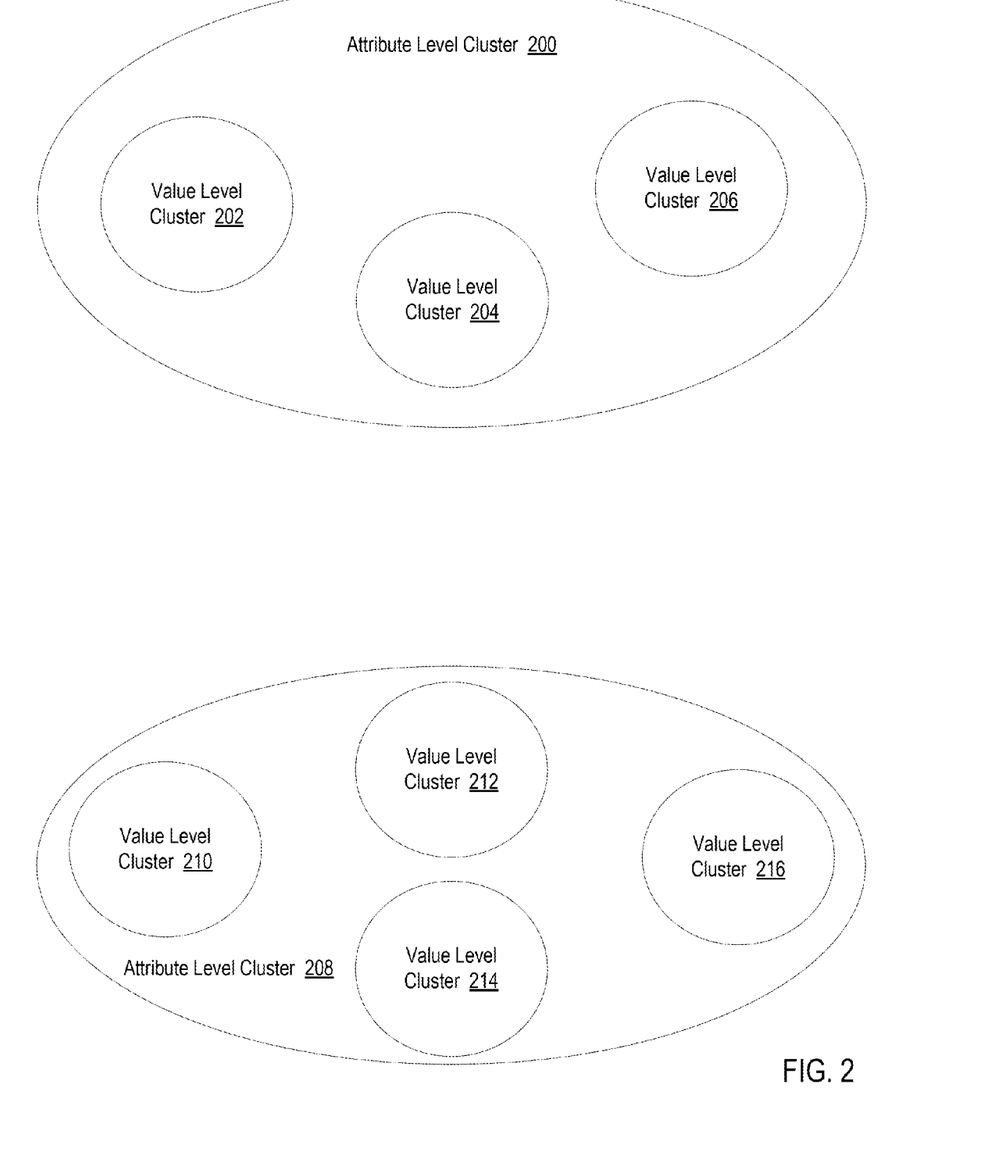
FIG. 2 sets forth a diagram of attribute level clusters and value level clusters according to embodiments of the present invention.

For further explanation, FIG. 2 sets forth a diagram of attribute level clusters (200, 208) and value level clusters (202, 204, 206, 210, 212, 214, 216) according to embodiments of the present invention. In the example of FIG. 2, each cluster (200, 202, 204, 206, 208, 210, 212, 214, 216) is a logical grouping of devices. Each attribute level cluster (200, 208) represents a logical grouping of devices based on the device attributes of each device that is included in the attribute level cluster (200, 208). In the example of FIG. 2, however, the value associated with device attributes are not a factor in determining which attribute level cluster (200, 208) a device should belong to. That is, devices are clustered into the same attribute level cluster (200, 208) on the basis of having similar attributes as other devices within the attribute level cluster (200, 208)—even if the values of the attributes are different.

In the example of FIG. 2, each value level cluster (202, 204, 206, 210, 212, 214, 216) represents a logical grouping of devices that is not only based on the device attributes of each device that is included in the value level cluster (202, 204, 206, 210, 212, 214, 216) but is also based on the value of each attribute for devices that are included in the value level cluster (202, 204, 206, 210, 212, 214, 216). That is, devices are clustered into the same value level cluster (202, 204, 206, 210, 212, 214, 216) on the basis of having similar attributes and similar attribute values as other devices within the value level cluster (202, 204, 206, 210, 212, 214, 216).

Figure 3:
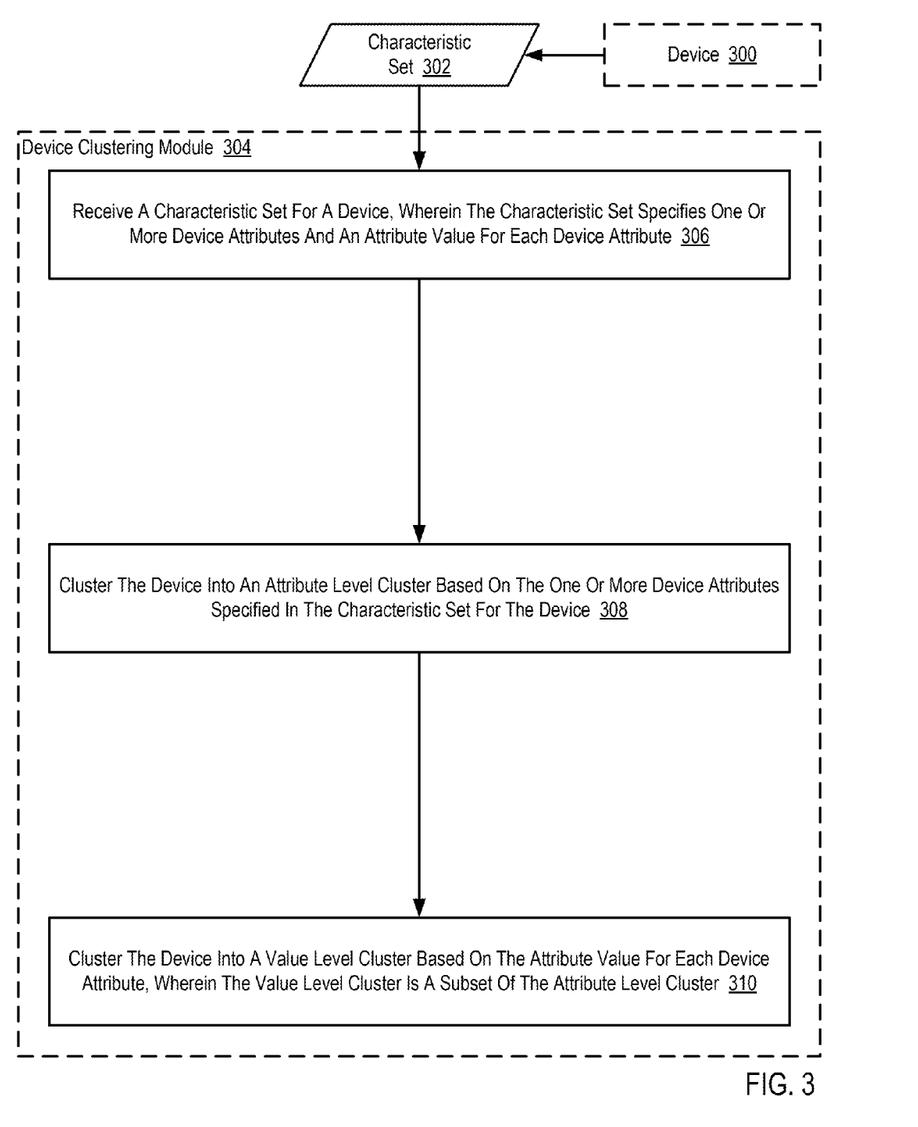
FIG. 3 sets forth a flow chart illustrating an example method for clustering devices in an IoT according to embodiments of the present invention.

For further explanation, FIG. 3 sets forth a flow chart illustrating an example method for clustering devices in an IoT according to embodiments of the present invention. The example method of FIG. 3 includes receiving (306), by a device clustering module (304), a characteristic set (302) for a device (300). In the example method of FIG. 3, the device clustering module (304) is a module of computer program instructions that, when executed, is configured to cluster Internet connected devices. The device clustering module (304) 'clusters' Internet connected devices in the sense that the device clustering module (304) associates similar Internet connected devices with a particular cluster group. The device clustering module (304) can cluster Internet connected devices, for example, through the use of a database, table, or other data structure that includes an identifier of a particular device and an identifier of a particular cluster that the device is part of Clustering similar Internet connected devices within a particular cluster group can enable a larger system to better manage a collection of heterogeneous devices by, for example, imposing some usage rules and policies on the set of similar devices that are included in a cluster group, provide access control and security restrictions to the set of similar devices that are included in a cluster group, perform device configuration operations on the set of similar devices that are included in a cluster group, and so on.

In the example method of FIG. 3, the characteristic set (302) specifies one or more device attributes and an attribute value for each device attribute. In the example method of FIG. 3, devices may be deemed as being similar and therefore subject to clustering in dependence on attributes of the device such as, for example, the type of network connection supported by the device, the communications protocols supported by the device, the manufacturer of the device, different capabilities of the device, and so on. In the example method of FIG. 3, such device attributes are specified in a characteristic set (302) that specifies one or more device attributes and an attribute value for each device attribute. The characteristic set (302) of FIG. 3 may be embodied, for example, as a structured document such as an extensible markup language ('XML') document that includes an identifier of a particular attribute of the device (300) as well as a value for the attribute. Consider the following example of a characteristic set (302) embodied as an XML document:

```
<ns:deviceData xmlns:ns="urn:foo">
    <ns: attribute id = "1">
        <ns:name>deviceType</ns:name>
        <ns:value>MobilePhone</ns:value>
    </ns:attribute>
    <ns: attribute id = "2">
        <ns:name>manufacturer</ns:name>
        <ns:value>Nokia</ns:value>
    </ns:attribute>
    <ns: attribute id = "3">
        <ns:name>model</ns:name>
        <ns:value>N72</ns:value>
    </ns:attribute>
</ns:deviceData>
```

In the example characteristic set (302) above, the characteristic set includes three attributes and values for each attribute that describe the device that the characteristic set (302) represents. The first attribute is a 'deviceType' attribute with a value set to 'MobilePhone' which indicates that the device is a mobile phone. The second attribute is a 'manufacturer' attribute with a value set to 'Nokia' which indicates that the mobile phone is manufactured by Nokia™. The third attribute is a 'model' attribute with a value set to 'N72' which indicates the manufacturer's mobile number for the mobile phone. Readers will appreciate that the example characteristic set (302) set forth above can include a number of additional attributes and values associated with such attributes that can be used to describe additional information about the device that is associated with the characteristic set.

The example method of FIG. 3 also includes clustering (308), by the device clustering module (304), the device (300) into an attribute level cluster based on the one or more device attributes specified in the characteristic set (302) for the device (300). In the example method of FIG. 3, the attribute level cluster is a cluster of devices that have similar attributes—with no consideration given to the values associated with each attribute. Clustering (308) the device (300) into an attribute level cluster based on the one or more device attributes specified in the characteristic set (302) for the device (300) may therefore be carried out by inspecting the attributes of devices within each attribute level cluster and identifying the attribute level cluster whose devices have attributes that are most similar to the device attributes specified in the characteristic set (302) for the device (300).

Consider an example in which the device is a mobile phone whose characteristic set (302) includes attributes named 'mobileCarrier,' 'areaCode,' 'gpsEnabled,' and 'telecommunicationsWirelessStandard.' Furthermore, assume that a first attribute level cluster includes devices that include attributes named 'mobileCarrier,' 'areaCode,' 'telecommunicationsWirelessStandard,' 'manufacturer,' and 'model.' Additionally, assume that a second attribute level cluster includes devices that include attributes named 'displayType,' 'screenSize,' 'numberOfHDMIPorts,' and 'dolbySoundVersion.' In such an example, the first attribute level cluster appears to be a cluster of mobile phones while the second attribute level cluster appears to be a cluster of televisions.

Clustering (308) the device (300) into an attribute level cluster based on the one or more device attributes specified in the characteristic set (302) for the device (300) may be carried out by inspecting the attributes of devices within each attribute level cluster and identifying the attribute level cluster whose devices have attributes that are most similar to the device attributes specified in the characteristic set (302) for the device (300). In the example described above, the mobile phone whose characteristic set (302) includes attributes named 'mobileCarrier,' 'areaCode,' 'gpsEnabled,' and 'telecommunicationsWirelessStandard' has three attributes in common with the devices in the first attribute level cluster and zero attributes in common with the devices in the second attribute level cluster. As such, the device (300) would be clustered into the first attribute level cluster as the device has attributes that are more similar to the devices in the first attribute level cluster than the devices in the second attribute level cluster.

The example method of FIG. 3 also includes clustering (310), by the device clustering module (304), the device (300) into a value level cluster based on the attribute value for each device attribute. In the example method of FIG. 3, the value level cluster is a cluster of devices that have similar attributes and also have similar values for identical attributes. In the example of FIG. 3, the value level cluster is a subset of the attribute level cluster.

Consider the example described above in which the device (300) is a mobile phone whose characteristic set (302) includes attributes named 'mobileCarrier,' 'areaCode,' 'gpsEnabled,' and 'telecommunicationsWirelessStandard.' In such an example, assume that the characteristic set (302) includes the following values for each attribute: mobileCarrier=Verizon, areaCode=512, gpsEnabled=yes, and telecommunicationsWirelessStandard=4G. Furthermore, assume that the attribute values of devices in a first value level cluster are: mobileCarrier=Sprint, areaCode=214, gpsEnabled=no, and telecommunicationsWirelessStandard=3G. Additionally, assume that the attribute values of devices in a first value level cluster are: mobileCarrier=Verizon, areaCode=214, gpsEnabled=yes, and telecommunicationsWirelessStandard=4G. In such an example, the values associated with each attribute of the device (300) match zero of the values of devices in the first value level cluster and the values associated with each attribute of the device (300) match three of the values of devices in the second value level cluster. In such an example, the device (300) can be clustered in the second value level cluster as the attribute values for the device (300) are more similar to devices in the second value level cluster than devices in the first value level cluster.

Figure 4:
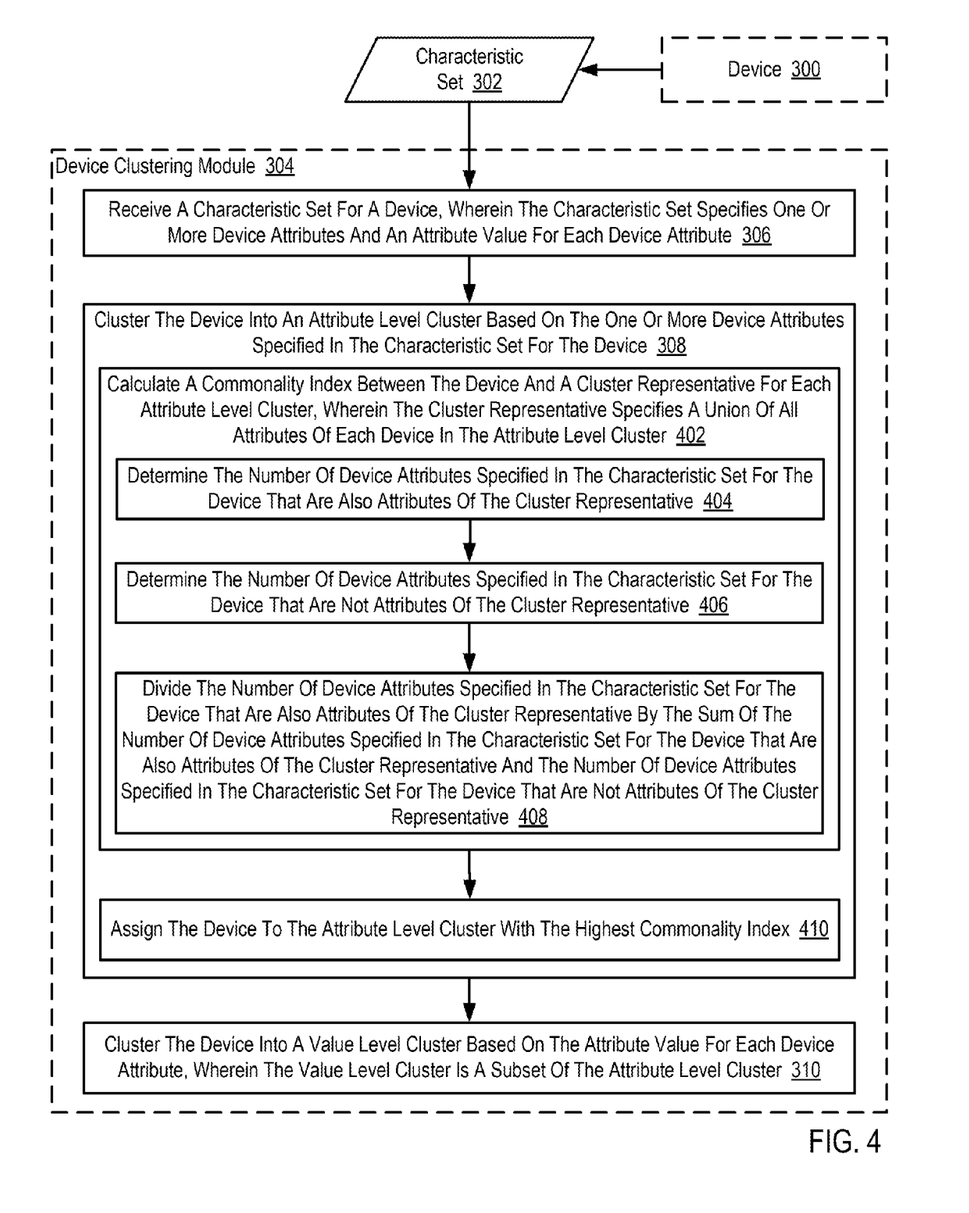
FIG. 4 sets forth a flow chart illustrating an example method for clustering devices in an IoT according to embodiments of the present invention.

For further explanation, FIG. 4 sets forth a flow chart illustrating an example method for clustering devices in an IoT according to embodiments of the present invention. The example method of FIG. 4 is similar to the example method of FIG. 3 as it also includes receiving (306) a characteristic set (302) for a device (300), clustering (308) the device (300) into an attribute level cluster, and clustering (310) the device (300) into a value level cluster.

In the example method of FIG. 4, clustering (308) the device (300) into an attribute level cluster can include calculating (402), by the device clustering module (304), a commonality index between the device (300) and a cluster representative for each attribute level cluster. In the example of FIG. 4, the cluster representative specifies a union of all attributes of each device in the attribute level cluster. For example, if a first device in the attribute level cluster includes attributes A, B, and C, while a second device in the attribute level cluster includes attributes B, C, and D, the cluster representative for the attribute level cluster would include attributes A, B, C, and D.

In the example method of FIG. 4, calculating (402), by the device clustering module (304), a commonality index between the device (300) and a cluster representative for each attribute level cluster can be carried out, for example, by determining the number of attributes that the device (300) has in common with the cluster representative for an attribute level cluster, by determining the number of attributes that the device (300) has that are not in common with the cluster representative for an attribute level cluster, by determining the percentage of attributes that the device (300) has in common with the cluster representative for an attribute level cluster, and so on.

In the example method of FIG. 4, calculating (402) a commonality index between the device (300) and a cluster representative for each attribute level cluster can include determining (404), by the device clustering module (304), the number of device attributes specified in the characteristic set (302) for the device (300) that are also attributes of the cluster representative. Consider an example in which the device (300) has attributes A, B, and C. Furthermore, assume that a cluster representative for a first attribute level cluster has attributes, A, D, E, and F, while a cluster representative for a second attribute level cluster has attributes B, C, and D. In such an example, the device (300) has one attribute in common with the first attribute level cluster and two attributes in common with the second attribute level cluster.

In the example method of FIG. 4, calculating (402) a commonality index between the device (300) and a cluster representative for each attribute level cluster can also include determining (406), by the device clustering module (304), the number of device attributes specified in the characteristic set (302) for the device (300) that are not attributes of the cluster representative. Consider the example described above in which the device (300) has attributes A, B, and C, a cluster representative for a first attribute level cluster has attributes, A, D, E, and F, and a cluster representative for a second attribute level cluster has attributes B, C, and D. In such an example, the device (300) has two attributes that are not attributes in the first attribute level cluster and the device (300) has one attribute that is not an attribute of second attribute level cluster.

In the example method of FIG. 4, calculating (402) a commonality index between the device (300) and a cluster representative for each attribute level cluster can also include dividing (408), by the device clustering module (304), the number of device attributes specified in the characteristic set (302) for the device (300) that are also attributes of the cluster representative by the sum of the number of device attributes specified in the characteristic set (302) for the device (300) that are also attributes of the cluster representative and the number of device attributes specified in the characteristic set (302) for the device (300) that are not attributes of the cluster representative. Consider the example described above in which the device (300) has one attribute (A) in common with a first attribute level cluster and two attributes (B and C) that are not contained by any device in the first attribute level cluster. In such an example, the commonality index between the device (300) and the first attribute level cluster is 1/(2+1) =1/3. In the same example, the device (300) has two attributes (B and C) in common with a second attribute level cluster and one attribute (A) that are is contained by any device in the second attribute level cluster. In such an example, the commonality index between the device (300) and the second attribute level cluster is 2/(1+2)=2/3.

Although the example described above illustrates an embodiment in which all attributes are weighted evenly, readers will appreciate that in alternative embodiments attributes may not be weighted equally. In the example described above, in alternative embodiments it may be deemed that attribute A is the most critical attribute of the device (300) while attributes B and C are less important. In such an example, calculating (402) a commonality index between the device (300) and a cluster representative for each attribute level cluster may take into account the relative importance of each attribute such that the commonality index is generated using a formula in which greater importance is placed on finding an attribute level cluster whose devices include attribute A while less importance if placed on finding an attribute level cluster whose devices include attributes B and C.

In the example method of FIG. 4, clustering (308) the device (300) into an attribute level cluster can also include assigning (410), by the device clustering module (304), the device (300) to the attribute level cluster with the highest commonality index. Continuing with the example described above, the device (300) would be assigned to the second attribute level cluster by virtue of the device (300) having a commonality index of 2/3 with the second attribute level cluster while the device (300) only has a commonality index of 1/3 with the first attribute level cluster. In the example of FIG. 4, assigning (410) the device (300) to the attribute level cluster with the highest commonality index may be carried out, for example, by updating an attribute level cluster table or other data structure that associates an attribute level cluster with the devices that are included in the attribute level cluster. Table 1 illustrates an example of an attribute level cluster table:

TABLE 1

Attribute Level Cluster Table

| Attribute Level Cluster ID | Device ID | Device Attributes |
|---|---|---|
| 1 | 1 | A, B |
| 1 | 2 | A, C |
| 1 | 3 | A, B, C |
| 2 | 4 | D, E |
| 2 | 5 | D, E |
| 2 | 6 | D, E, F |
| 2 | 7 | E, F |

In the example illustrated in Table 1, two attribute level clusters are identified: an attribute level cluster with a cluster identifier of '1' and an attribute level cluster with a cluster identifier of '2.' The attribute level cluster with a cluster identifier of '1' includes three devices: a device with a device identifier of '1,' a device with a device identifier of '2,' and a device with a device identifier of '3.' The attribute level cluster with a cluster identifier of '2' includes four devices: a device with a device identifier of '4,' a device with a device identifier of '5,' a device with a device identifier of '6,' and a device with a device identifier of '7.' In addition, the attribute level cluster table above also identifies the attributes for each device specified in Table 1.

Figure 5:
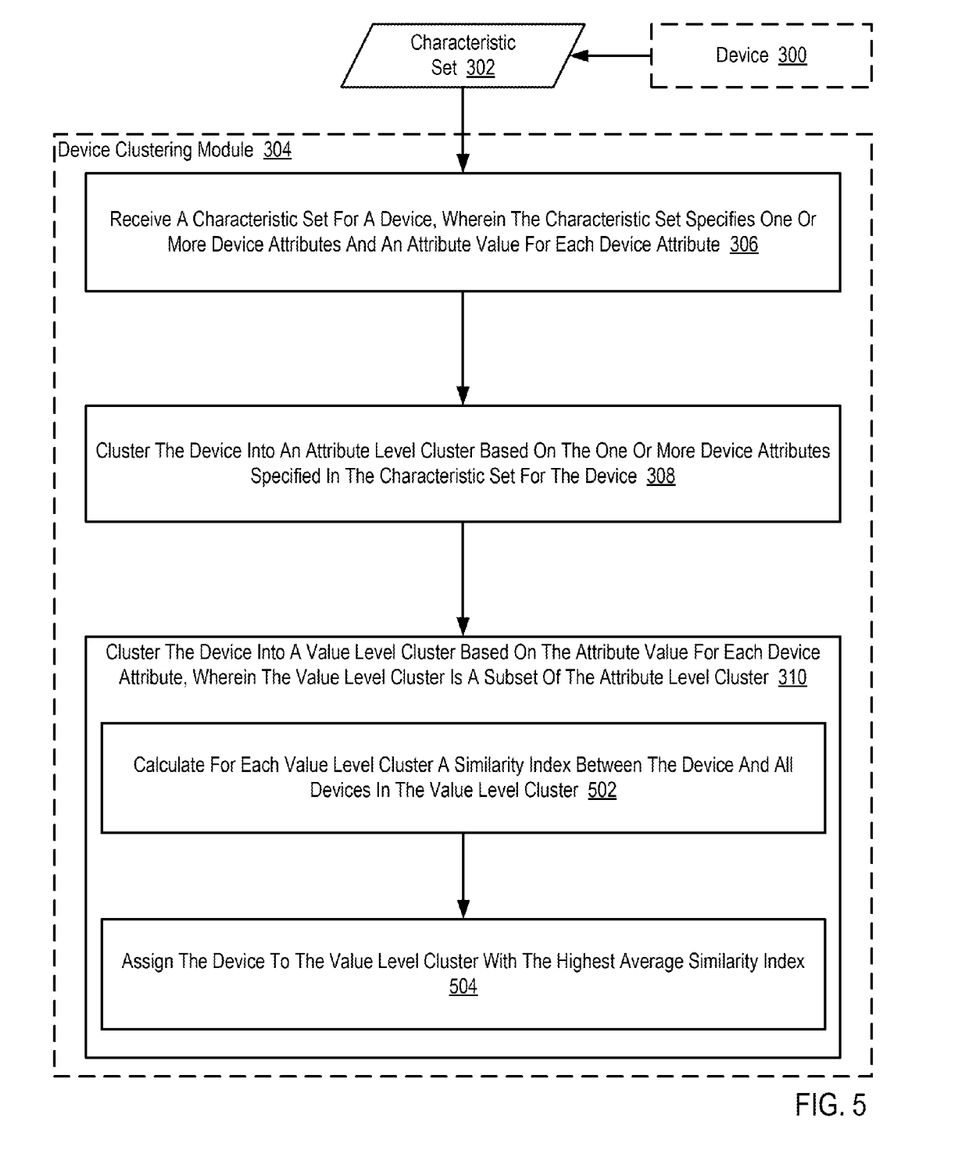
FIG. 5 sets forth a flow chart illustrating an example method for clustering devices in an IoT according to embodiments of the present invention.

For further explanation, FIG. 5 sets forth a flow chart illustrating an example method for clustering devices in an IoT according to embodiments of the present invention. The example method of FIG. 5 is similar to the example method of FIG. 3 as it also includes receiving (306) a characteristic set (302) for a device (300), clustering (308) the device (300) into an attribute level cluster, and clustering (310) the device (300) into a value level cluster. In the example method of FIG. 5, clustering (310) the device (300) into a value level cluster can include calculating (502) for each value level cluster, by the device clustering module (304), a similarity index between the device (300) and all devices in the value level cluster. Calculating (502), for each value level cluster, a similarity index between the device (300) and all devices in the value level cluster may be carried out by calculating a similarity index between the device (300) and each device in every value level cluster. After calculating a similarity index between the device (300) and each device in every value level cluster, the device clustering module (304) may identify the devices that are in a particular value level cluster, sum up the similarity index between the device (300) and each device in the particular value level cluster, and divide that sum by the number of devices in the particular value level cluster to identify an average similarity index between the device (300) and the devices in the particular value level cluster.

Consider an example in which the similarity index between the device (300) and devices in a first value level cluster are 0.1, 0.2, and 0.3. In such an example, the similarity index between the device (300) and the devices in the first value level cluster is (0.1+0.2+0.3)/3=0.2. In the same example, assume that the similarity index between the device (300) and devices in a second value level cluster are 0.1, 0.2, 0.3, and 0.3. In such an example, the similarity index between the device (300) and the devices in the second value level cluster is (0.1+0.2+0.3+0.3)/4=0.225.

In the example method of FIG. 5, clustering (310) the device (300) into a value level cluster can also include assigning (504), by the device clustering module (304), the device (300) to the value level cluster with the highest average similarity index. Consider the example describe above in which the similarity index between the device (300) and the devices in the first value level cluster is 0.2 and the similarity index between the device (300) and the devices in the second value level cluster is 0.225. In such an example, the device (300) would be assigned (504) to the second value level cluster because the similarity index between the device (300) and devices in the second value level cluster is higher that the similarity index between the device (300) and devices in the first value level cluster.

In the example of FIG. 5, assigning (504) the device (300) to the value level cluster with the highest average similarity index may be carried out, for example, by updating an value level cluster table or other data structure that associates a value level cluster with the devices that are included in the value level cluster. Table 2 illustrates an example of a value level cluster table:

TABLE 2

Value Level Cluster Table

| Value Level Cluster ID | Device ID | Attribute Level Cluster ID |
|---|---|---|
| 1 | 1 | 1 |
| 2 | 2 | 1 |
| 2 | 3 | 1 |
| 3 | 4 | 1 |
| 4 | 5 | 2 |
| 4 | 6 | 2 |
| 5 | 7 | 2 |

In the example illustrated in Table 2, five value level clusters are identified: a value level cluster with a cluster identifier of '1,' a value level cluster with a cluster identifier of '2,' a value level cluster with a cluster identifier of '3,' a value level cluster with a cluster identifier of '4,' and a value level cluster with a cluster identifier of '5.' The value level cluster with a cluster identifier of '1' includes one device identified by a device identifier of '1' and is part of an attribute level cluster identified by an attribute level cluster identifier of '1.' The value level cluster with a cluster identifier of '2' includes one device identified by a device identifier of '2,' a second device identified by a device identifier of '3,' and is also part of an attribute level cluster identified by an attribute level cluster identifier of '1.' The value level cluster with a cluster identifier of '3' includes one device identified by a device identifier of '4' and is also part of an attribute level cluster identified by an attribute level cluster identifier of '1.' The value level cluster with a cluster identifier of '4' includes one device identified by a device identifier of '5,' a second device identified by a device identifier of '6,' and is part of an attribute level cluster identified by an attribute level cluster identifier of '2.' The value level cluster with a cluster identifier of '5' includes one device identified by a device identifier of '7' and is also part of an attribute level cluster identified by an attribute level cluster identifier of '2.'

Figure 6:
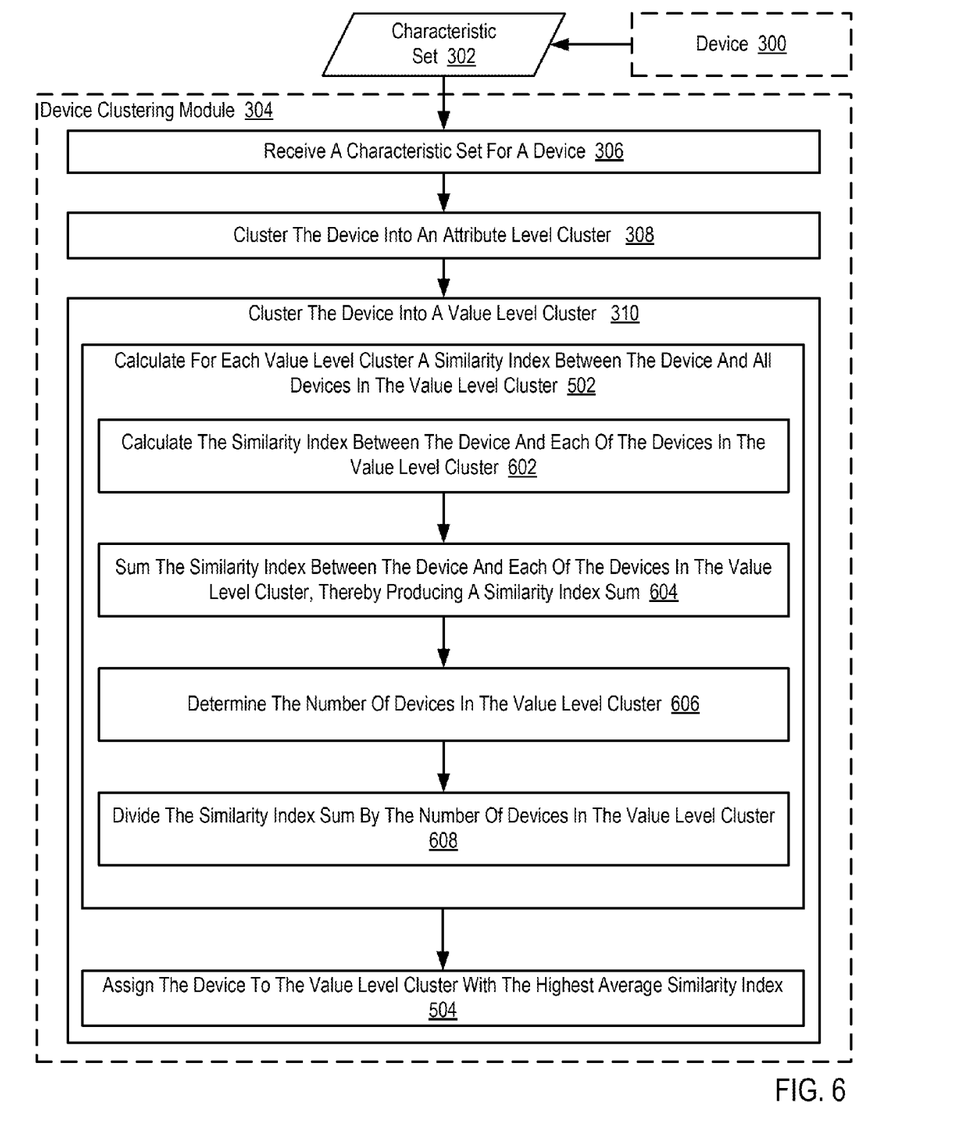
FIG. 6 sets forth a flow chart illustrating an example method for clustering devices in an IoT according to embodiments of the present invention.

For further explanation, FIG. 6 sets forth a flow chart illustrating an example method for clustering devices in an IoT according to embodiments of the present invention. The example method of FIG. 6 is similar to the example method of FIG. 5 as it also includes receiving (306) a characteristic set (302) for a device (300), clustering (308) the device (300) into an attribute level cluster, clustering (310) the device (300) into a value level cluster, including calculating (502) for each value level cluster a similarity index between the device and all devices in the value level cluster and assigning (504) the device to the value level cluster with the highest average similarity index.

In the example method of FIG. 6, calculating (502) for each value level cluster a similarity index between the device and all devices in the value level cluster also includes, for each value level cluster, calculating (602) the similarity index between the device (300) and each of the devices in the value level cluster. In the example of FIG. 6, calculating (602) the similarity index between the device (300) and each of the devices in the value level cluster is carried out by the device clustering module (304). Calculating (602) the similarity index between the device (300) and each of the devices in the value level cluster can carried out, for example, by comparing the values for attributes of the device (300) to values for the same attributes of devices with the value level cluster.

Consider an example in which the device (300) includes attributes A, B, and C, and a device in the value level cluster included attributes A, B, and D. In such an example, the value associated with attribute A of the device (300) can be compared to the value associated with attribute A of the device in the value level cluster. Likewise, the value associated with attribute B of the device (300) can be compared to the value associated with attribute B of the device in the value level cluster. If the values are identical, or match within a predefined threshold, the similarity index between the device (300) and the device in the value level cluster is increased. In the example method of FIG. 6, the similarity index can be increased according to a weighting scheme in which certain attributes are weighted more heavily than others.

In the example method of FIG. 6, calculating (502) for each value level cluster a similarity index between the device and all devices in the value level cluster also includes, for each value level cluster, summing (604) the similarity index between the device (300) and each of the devices in the value level cluster, thereby producing a similarity index sum. In the example of FIG. 6, summing (604) the similarity index between the device (300) and each of the devices in the value level cluster is carried out by the device clustering module (304). Consider an example in which the similarity index between the device (300) and devices in a first value level cluster are 0.1, 0.2, and 0.3. In such an example, the similarity index sum between the device (300) and devices in the first value level cluster is 0.1+0.2+0.3=0.6. In the same example, assume that the similarity index between the device (300) and devices in a second value level cluster are 0.1, 0.2, 0.3, and 0.3. In such an example, the similarity index sum is 0.1+0.2+0.3+0.3=0.9.

In the example method of FIG. 6, calculating (502) for each value level cluster a similarity index between the device and all devices in the value level cluster also includes, for each value level cluster, determining (606) the number of devices in the value level cluster. In the example method of FIG. 6, determining (606) the number of devices in the value level cluster is carried out by the device clustering module (304). The device clustering module (304) may determine the number of devices in the value level cluster, for example, by scanning a value level cluster table as illustrated above with reference to Table 2.

In the example method of FIG. 6, calculating (502) for each value level cluster a similarity index between the device and all devices in the value level cluster also includes, for each value level cluster, dividing (608) the similarity index sum by the number of devices in the value level cluster. Consider the example described above in which the similarity index sum between the device (300) and devices in the first value level cluster is 0.6 and the similarity index between the device (300) and devices in a second value level cluster is 0.9. The first value level cluster includes 3 devices such that dividing (608) the similarity index sum by the number of devices in the first value level cluster produces an average similarity index of 0.6/3=0.2. The second value level cluster includes 4 devices such that dividing (608) the similarity index sum by the number of devices in the first value level cluster produces an average similarity index of 0.9/4=0.225.

The weights of an attribute can be a function of its importance, entropy, dispersion, and so on. Let $w=\{w_1, w_2, w_3, \ldots, w_n\}$ be the set of weights of attributes where $w_i$ is the weight of attribute $a_i$. In such an example, the weight are normalized such that such that the sum of all weights in the set of weights is equal to 1. Between two devices, $D_i$ and $D_j$, the common set of attribute-value pairs between the two devices is characterized as the intersection of the attribute-value set for $D_i$ and the attribute-value set for $D_j$. Furthermore, the common set of attributes between the two devices is characterized as the intersection of the attribute set for $D_i$ and the attribute set for $D_j$. In such an example, if attribute-value pair exists in each device, the attribute-value pair is part of the common set of attribute-value pairs denoted as $Z_{ij}$ for devices $D_i$ and $D_j$. If, however, an attribute is shared by each device but the value associated with the similar attributes does not match, the attribute is part of the common set of attributes denoted as $Z'_{ij}$ for devices $D_i$ and $D_j$. In such an example, the similarity index between the two devices $D_i$ and $D_j$ can be calculated as $(\alpha+\beta)$ times the weighted sum of the attributes that are in the common set of attribute-value pairs denoted as $Z_{ij}$ plus $\alpha$ times the weighted sum of the attributes that are in the common set of attributes denoted as $Z'_{ij}$. In such an example, $\alpha+\beta$ are two parameters that control the importance given to a match of an attribute and a match of its corresponding value. Thinking of this example as instituting a points system, if there is only an attribute match then only $\alpha$ points are awarded whereas if the there is both a match of an attribute and its corresponding value, then $\alpha+\beta$ points are awarded under the precondition that $\alpha+\beta=1$.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of clustering devices in an Internet of Things ('IoT'), the method comprising:
   receiving, by a device clustering module, a characteristic set for a device, wherein the characteristic set specifies one or more device attributes and an attribute value for each device attribute;
   clustering, by the device clustering module, the device into an attribute level cluster based on the one or more device attributes specified in the characteristic set for the device; and
   clustering, by the device clustering module, the device into a value level cluster based on the attribute value for each device attribute, wherein the value level cluster is a subset of the attribute level cluster.

2. The method of claim 1 wherein the characteristic set is specified as an extensible markup language ('XML') structured document.

3. The method of claim 1 wherein clustering the device into an attribute level cluster based on the one or more device attributes specified in the characteristic set for the device further comprises:
   calculating, by the device clustering module, a commonality index between the device and a cluster representative for each attribute level cluster, wherein the cluster representative specifies a union of all attributes of each device in the attribute level cluster; and
   assigning, by the device clustering module, the device to the attribute level cluster with the highest commonality index.

4. The method of claim 3 wherein calculating a commonality index between the device and a cluster representative for each attribute level cluster further comprises:
   determining, by the device clustering module, the number of device attributes specified in the characteristic set for the device that are also attributes of the cluster representative;
   determining, by the device clustering module, the number of device attributes specified in the characteristic set for the device that are not attributes of the cluster representative; and
   dividing, by the device clustering module, the number of device attributes specified in the characteristic set for the device that are also attributes of the cluster representative by the sum of the number of device attributes specified in the characteristic set for the device that are also attributes of the cluster representative and the number of device attributes specified in the characteristic set for the device that are not attributes of the cluster representative.

5. The method of claim 1 wherein clustering the device into a value level cluster based on the attribute value for each device attribute further comprises:
   calculating for each value level cluster, by the device clustering module, a similarity index between the device and all devices in the value level cluster; and
   assigning, by the device clustering module, the device to the value level cluster with the highest average similarity index.

6. The method of claim 5 wherein calculating for each value level cluster a similarity index between the device and all devices in the value level cluster further comprises:
   for each value level cluster:
   calculating, by the device clustering module, the similarity index between the device and each of the devices in the value level cluster;
   summing, by the device clustering module, the similarity index between the device and each of the devices in the value level cluster, thereby producing a similarity index sum;
   determining, by the device clustering module, the number of devices in the value level cluster; and
   dividing, by the device clustering module, the similarity index sum by the number of devices in the value level cluster.

7. An apparatus for clustering devices in an Internet of Things ('IoT'), the apparatus comprising a computer processor, a computer memory operatively coupled to the computer processor, the computer memory having disposed within it computer program instructions that, when executed by the computer processor, cause the apparatus to carry out the steps of:
   receiving, by a device clustering module, a characteristic set for a device, wherein the characteristic set specifies one or more device attributes and an attribute value for each device attribute;
   clustering, by the device clustering module, the device into an attribute level cluster based on the one or more device attributes specified in the characteristic set for the device; and
   clustering, by the device clustering module, the device into a value level cluster based on the attribute value for each device attribute, wherein the value level cluster is a subset of the attribute level cluster.

8. The apparatus of claim 7 wherein the characteristic set is specified as an extensible markup language ('XML') structured document.

9. The apparatus of claim 7 wherein clustering the device into an attribute level cluster based on the one or more device attributes specified in the characteristic set for the device further comprises:
   calculating, by the device clustering module, a commonality index between the device and a cluster representative for each attribute level cluster, wherein the cluster representative specifies a union of all attributes of each device in the attribute level cluster; and
   assigning, by the device clustering module, the device to the attribute level cluster with the highest commonality index.

10. The apparatus of claim 9 wherein calculating a commonality index between the device and a cluster representative for each attribute level cluster further comprises:
    determining, by the device clustering module, the number of device attributes specified in the characteristic set for the device that are also attributes of the cluster representative;
    determining, by the device clustering module, the number of device attributes specified in the characteristic set for the device that are not attributes of the cluster representative; and
    dividing, by the device clustering module, the number of device attributes specified in the characteristic set for the device that are also attributes of the cluster representative by the sum of the number of device attributes specified in the characteristic set for the device that are also attributes of the cluster representative and the number of device attributes specified in the characteristic set for the device that are not attributes of the cluster representative.

11. The apparatus of claim 7 wherein clustering the device into a value level cluster based on the attribute value for each device attribute further comprises:
calculating for each value level cluster, by the device clustering module, a similarity index between the device and all devices in the value level cluster; and
assigning, by the device clustering module, the device to the value level cluster with the highest average similarity index.

12. The apparatus of claim 11 wherein calculating for each value level cluster a similarity index between the device and all devices in the value level cluster further comprises:
for each value level cluster:
calculating, by the device clustering module, the similarity index between the device and each of the devices in the value level cluster;
summing, by the device clustering module, the similarity index between the device and each of the devices in the value level cluster, thereby producing a similarity index sum;
determining, by the device clustering module, the number of devices in the value level cluster; and
dividing, by the device clustering module, the similarity index sum by the number of devices in the value level cluster.

13. A computer program product for clustering devices in an Internet of Things ('IoT'), the computer program product disposed upon a computer readable storage medium, wherein the computer readable storage medium is not a signal, the computer program product comprising computer program instructions that, when executed, cause a computer to carry out the steps of:
receiving, by a device clustering module, a characteristic set for a device, wherein the characteristic set specifies one or more device attributes and an attribute value for each device attribute;
clustering, by the device clustering module, the device into an attribute level cluster based on the one or more device attributes specified in the characteristic set for the device; and
clustering, by the device clustering module, the device into a value level cluster based on the attribute value for each device attribute, wherein the value level cluster is a subset of the attribute level cluster.

14. The computer program product of claim 13 wherein the characteristic set is specified as an extensible markup language ('XML') structured document.

15. The computer program product of claim 13 wherein clustering the device into an attribute level cluster based on the one or more device attributes specified in the characteristic set for the device further comprises:
calculating, by the device clustering module, a commonality index between the device and a cluster representative for each attribute level cluster, wherein the cluster representative specifies a union of all attributes of each device in the attribute level cluster; and
assigning, by the device clustering module, the device to the attribute level cluster with the highest commonality index.

16. The computer program product of claim 15 wherein calculating a commonality index between the device and a cluster representative for each attribute level cluster further comprises:
determining, by the device clustering module, the number of device attributes specified in the characteristic set for the device that are also attributes of the cluster representative;
determining, by the device clustering module, the number of device attributes specified in the characteristic set for the device that are not attributes of the cluster representative; and
dividing, by the device clustering module, the number of device attributes specified in the characteristic set for the device that are also attributes of the cluster representative by the sum of the number of device attributes specified in the characteristic set for the device that are also attributes of the cluster representative and the number of device attributes specified in the characteristic set for the device that are not attributes of the cluster representative.

17. The computer program product of claim 13 wherein clustering the device into a value level cluster based on the attribute value for each device attribute further comprises:
calculating for each value level cluster, by the device clustering module, a similarity index between the device and all devices in the value level cluster; and
assigning, by the device clustering module, the device to the value level cluster with the highest average similarity index.

18. The computer program product of claim 17 wherein calculating for each value level cluster a similarity index between the device and all devices in the value level cluster further comprises:
for each value level cluster:
calculating, by the device clustering module, the similarity index between the device and each of the devices in the value level cluster;
summing, by the device clustering module, the similarity index between the device and each of the devices in the value level cluster, thereby producing a similarity index sum;
determining, by the device clustering module, the number of devices in the value level cluster; and
dividing, by the device clustering module, the similarity index sum by the number of devices in the value level cluster.

* * * * *